United States Patent Office

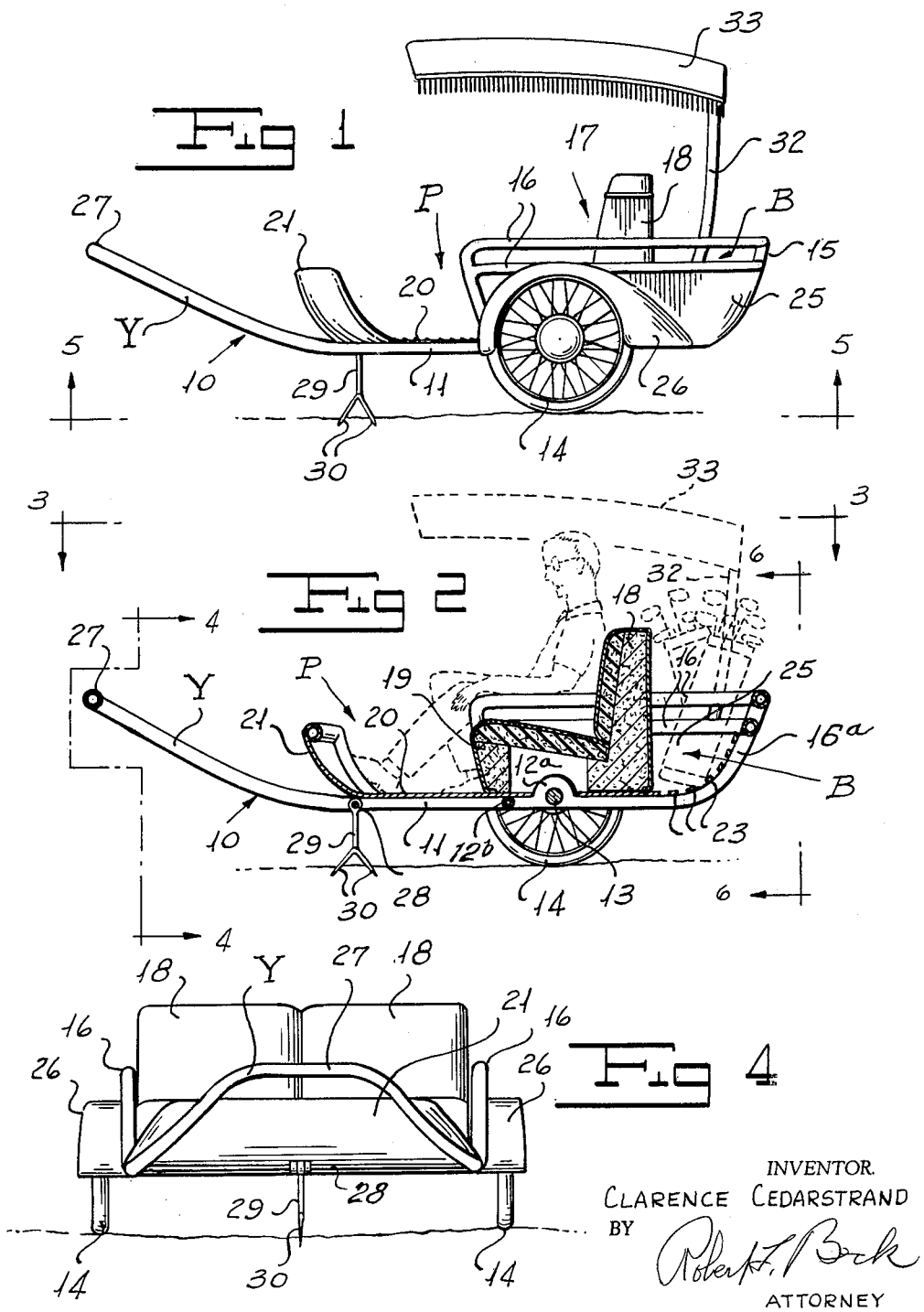

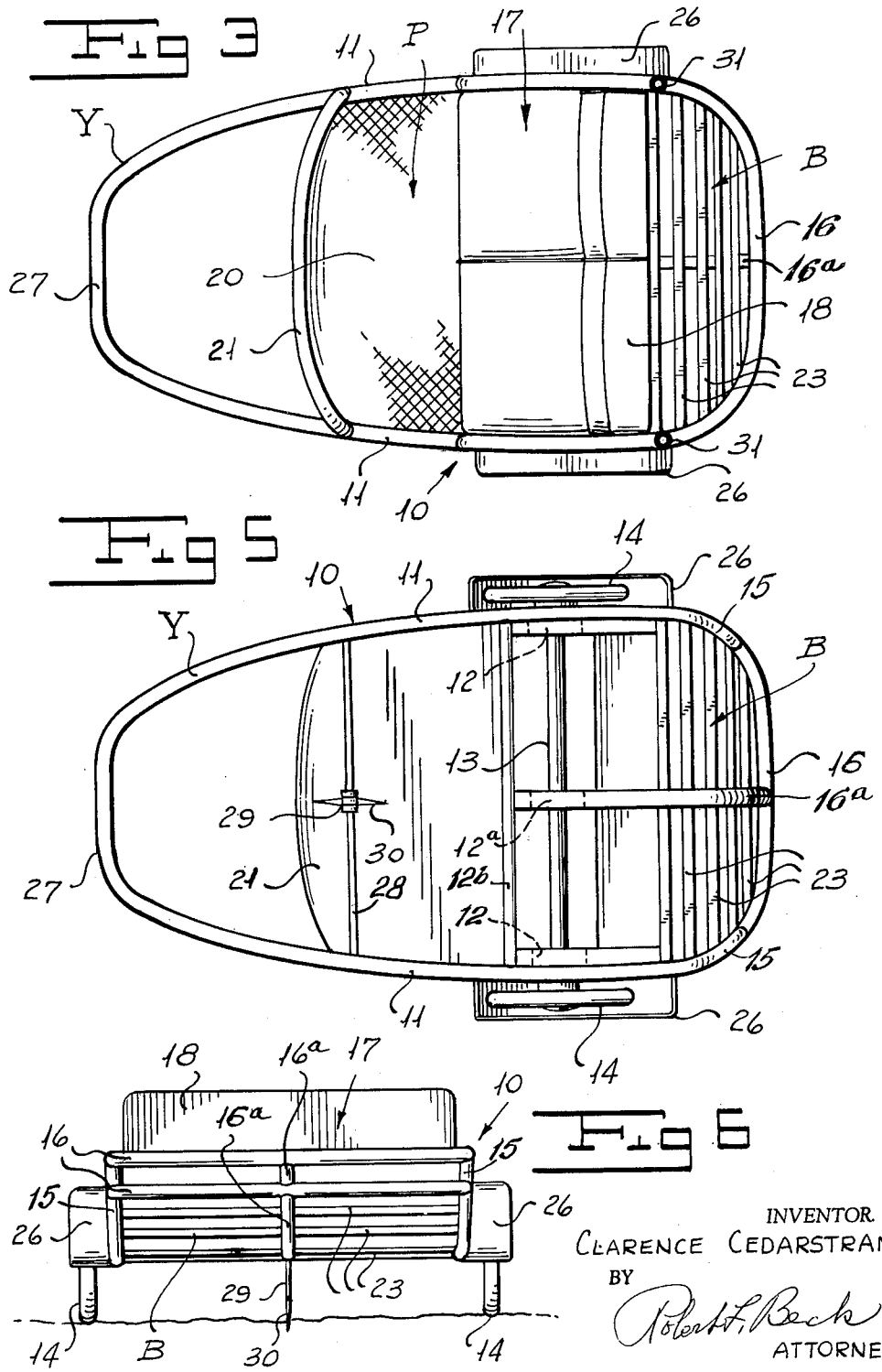

3,141,681
Patented July 21, 1964

1

3,141,681
VEHICLE WITH ADJACENT PASSENGER AND
BAGGAGE COMPARTMENTS
Clarence Cedarstrand, 5 Heights Road, Ridgewood, N.J.
Filed July 6, 1962, Ser. No. 208,079
4 Claims. (Cl. 280—47.25)

My invention relates to vehicles and more particularly to vehicles capable of being used on golf courses and the like.

One of the objects of my invention is to provide a wheeled vehicle constructed in a manner to permit the use of relatively lightweight material to facilitate hauling of the vehicle by a person with a minimum of labor.

Another object of my invention is to provide a wheeled vehicle provided with adjacent passenger and baggage compartments with the passenger compartment being arranged for distributing the weight of a passenger in a manner to counteract accidental tilting of the vehicle during hauling over the ground.

A further object of my invention is to provide a vehicle of the foregoing described character wherein the forward portion of the vehicle is equipped with means to maintain the vehicle in a raised position above the ground, when not in use, to facilitate the seating of a passenger.

A still further object of my invention is to provide a vehicle of the foregoing described character equipped with forward extending means by which the operator may readily haul the vehicle over the ground without undue difficulty before starting.

An important object of my invention is to provide a vehicle of the foregoing described character capable of being equipped with a suitable canopy for protecting the passenger from the sun.

Another important object of my invention is to provide a vehicle of the foregoing described character which is simple in construction, durable in use, efficient in operation, and economical in manufacture.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

FIGURE 1 is a side elevational of my invention;
FIGURE 2 is a longitudinal sectional view thereof;
FIGURE 3 is a top plan view of my invention with the canopy removed and taken on the plane of the line 3—3 of FIGURE 2;
FIGURE 4 is an end elevation taken on the plane of the line 4—4 of FIGURE 2;
FIGURE 5 is a bottom plan view of the vehicle; and
FIGURE 6 is a rear elevation of the invention taken on the plane of the line 6—6.

As illustrated in the drawings, my invention comprises a low slung two-wheeled vehicle comprising a frame or chassis 10 constructed of lightweight tubular material, for instance, aluminum or the like. The chassis 10 is formed with a pair of side frame members 11 provided with hubs 12 receiving therethrough an axle 13 on which the chassis is mounted. The ends of the axle 13 are equipped with roller-bearing type wheels 14 for movement of the vehicle over the ground.

The members 11 are provided with front and rear sections relative to the hubs 12 with the latter sections being formed with rearwardly and upwardly extending spaced side portions 15 between which are disposed and connected thereto the backs of U-shaped braces 16. The braces 16 are provided with sides which extend forwardly and downwardly from the portions 15 and are secured to the front sections of the members 11, respectively. An intermediate brace 16a is disposed between the side members and has its front or lower end provided with a hub 12a for receiving the axle 13 and which front end is fixed to a cross bar 12b connected to the front sections of the members 11, respectively. The rear or opposite end of the brace 16a extends rearwardly and upwardly and is connected to the backs of the braces 16 intermediate the side portions 15. Mounted above the axle 13 is a seat having a seating portion and provided with back and front walls 18 and 19, respectively. The lower ends of the walls 18 and 19 are fixed to a floor 20 secured to the members 11 and extending forwardly of the axle an appreciable distance and terminating in a dashboard 21, the latter cooperating with the seat to define a passenger compartment P. The seating portion of the seat is provided with lightweight cushions, for instance, foam rubber of the like.

The walls 18 and 19 are spaced rearwardly and forwardly of the respective sides of the axle with the floor 20 extending under and terminating at the rear of the wall 18. The side portions 15 and the brace 16a are provided with spaced transversely extending slats 23 which cooperate with the rear wall 18 and the braces 16 to define a baggage compartment B disposed rearwardly of the seat and in which articles may be stored and carried, for instance, golf clubs.

Secured to the sides of the members 11 and the portions 15, below the braces 16, are shields 25 enclosing the sides of the baggage compartment B and formed with fenders 26 extending over the weels 14. The front sections of the members 11 extend forwardly of the compartment P and terminate in an upwardly inclined yoke Y formed with a hand or draw-bar 27 for grasping by the operator to pull the vehicle over the ground.

Subjacent the dashboard 21 there is connected to the members 11 a pivot rod 28 on which is mounted a supporting fork or means 29 having a lower end formed with a pair of angularly outwardly and downwardly extending prongs or legs 30 for engaging the ground to support the front end of the vehicle above the ground and on an even keel when not in use. The means 29 is freely pivoted to the rod 28 to insure engagement with the ground when the frame is lowered from a raised position.

The braces 16, adjacent the portions 15, are provided with sockets 31 in which are detachably received the lower ends of a frame 32 of a canopy 33 extending over the seat 17 to protect the occupant from the sun. It will be noted that the seating portion of the seat 17 is so arranged with respect to the axle 13 to distribute the weight of the passenger slightly forward of the axle to preclude accidental pivoting of the chassis rearwardly and to insure support by the means 29 when not in use.

In use, the bar 27 is grasped by the operator, and due to its short height with respect to the ground, the yoke Y will be lifted upwardly to cause the front of the chassis to be raised a sufficient distance to disengage the means 29 from the ground and thus enable the operator to pull the vehicle over the ground. Should the surface of the ground be uneven to the extent that the means 29 would engage the ground, it would pivot rearwardly and assume its vertical position upon becoming disengaged.

From the foregoing it will be apparent that my invention provides an extremely simple means of transportation, particularly for use over a golf course and which may be readily drawn by a caddy with the clubs being stored within the baggage compartment B.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is, therefore, to be understood that the invention is not limited to the specific construction as illustrated and described, as the same is only illustrative of the principles involved which are capable of extended application in various forms, and the invention comprehends all construction within the scope of the appended claims.

What I claim is:

1. A vehicle having a frame provided with a pair of side members formed with connected front and rear sections, respectively, wheel mounting means secured to said frame intermediate said front and rear sections and equipped with wheels for hauling said vehicle over the ground, flooring means extending between and connected to said front and rear sections, a seat disposed over said mounting means between said wheels and having front and rear walls secured to said flooring means, said rear sections formed with rearwardly and upwardly extending side portions spaced rearwardly from said rear wall, respectively, slats connected to and extending between said side portions rearwardly of said flooring means, brace means disposed between and connecting said side portions together in spaced relation, said brace means extending forwardly and downwardly from said portions and connected to said front sections, respectively, said front sections being of a greater length than said rear sections and terminating forwardly beyond said mounting means in an upwardly extending yoke adapted to be grasped by an operator for hauling the vehicle over the ground, a dashboard connected to said flooring means and extending upwardly from said front sections, said dashboard being spaced forwardly from said seat and cooperating with the latter and said floor means to define a passenger compartment between said dashboard and said seat, said rear wall being spaced forwardly from said portions and cooperating with said brace means and said slats to define a baggage compartment having sides and disposed rearwardly of said seat, and shields enclosing said sides of said baggage compartment and secured to said side members and said portions, respectively.

2. A vehicle having a frame provided with a pair of side members formed with connected front and rear sections, respectively, an axle secured to said frame intermediate said front and rear sections and equipped with wheels for hauling said vehicle over the ground, flooring means extending between and connected to said front and rear sections, a seat disposed over said axle between said wheels and having front and rear walls fixed to said flooring means, said rear sections formed with rearwardly and upwardly extending side portions spaced rearwardly from said rear wall, respectively, slats connected to and extending between said side portions rearwardly of said flooring means, a brace having a back connecting said portions together in spaced relation rearwardly of said seat and sides disposed laterally of said seat, said sides extending forwardly and downwardly from said portions and connected to said front sections, respectively, said front sections being of a greater length than said rear sections and terminating forwardly beyond said axle in an upwardly extending yoke adapted to be grasped by an operator for hauling the vehicle over the ground, a dashboard connected to said flooring means and extending upwardly from said front sections, said dashboard being spaced forwardly from said seat and cooperating with the latter and said flooring means to define a passenger compartment between said dashboard and seat, said rear wall being spaced forwardly from said portions and cooperating with said brace and said slats to define a baggage compartment having sides and disposed rearwardly of said seat, and shields enclosing said sides of said baggage compartment and secured to said side members and said portions, respectively.

3. A vehicle having a frame provided with a pair of side members formed with connected front and rear sections, respectively, wheel mounting means secured to said frame intermediate said front and rear sections and equipped with wheels for hauling said vehicle over the ground, flooring means extending between and connected to said front and rear sections, a seat provided with a seating portion disposed over said mounting means between said wheels and having front and rear walls secured to said flooring means, said seating portion being disposed a greater distance forwardly than rearwardly of said mounting means, said rear sections formed with rearwardly and upwardly extending side portions spaced rearwardly from said rear wall, respectively, slats connected to and extending between said side portions rearwardly of said flooring means, a U-shaped brace connecting said side portions together in spaced relation rearwardly of said rear wall, said brace extending forwardly and downwardly from said portions and connected to said front sections, respectively, said front sections being of a greater length than said rear sections and terminating forwardly beyond said mounting means in an upwardly extending yoke adapted to be grasped by an operator for hauling the vehicle over the ground, a dashboard connected to said flooring means and extending upwardly from said front sections, said dashboard being spaced forwardly from said seat and cooperating with the latter and said flooring means to define a passenger compartment between said dashboard and said seat, said rear wall being spaced forwardly from said side portions and cooperating with said brace means and said slats to define a baggage compartment having sides and disposed rearwardly of said seat, and shields enclosing said sides of said baggage compartment and secured to said side members and said side portions, respectively, said shields being provided with fenders extending over said wheels, respectively.

4. A vehicle having a low-slung frame provided with a pair of side members formed with integrally connected front and rear sections, respectively, an axle secured to said frame intermediate said front and rear sections and equipped with wheels for hauling said vehicle over the ground, flooring means extending between and connected to said front and rear sections, a seat provided with a seating portion disposed over said axle between said wheels and having front and rear walls fixed to said flooring means, said seating portion being disposed a greater distance forwardly than rearwardly of said axle, said rear sections formed with rearwardly and upwardly extending side portions spaced rearwardly from said rear wall, respectively, slats connected to and extending between said side portions rearwardly of said flooring means, a brace having a back connecting said side portions together in spaced relation rearwardly of said seat and sides disposed laterally of said seat, said sides extending forwardly and downwardly from said side portions and connected to said front sections, respectively, said front sections being of a greater length than said rear sections and terminating forwardly beyond said axle in an upwardly extending yoke adapted to be grasped by an operator for hauling the vehicle over the ground, a dashboard connected to said flooring means and extending upwardly from said front sections, said dashboard being spaced forwardly from said seat and cooperating with the latter and said flooring means to define a passenger compartment between said dashboard and seat, said rear wall being spaced forwardly from said side portions and cooperating with said brace and said slats to define a baggage compartment having sides and disposed rearwardly of said seat, shields enclosing said sides of said baggage compartment and secured to said side members and said side portions, respectively, and a second brace disposed between said side members and having one end connected to said front sections and its opposite end extending upwardly and connected to said back of said first mentioned brace intermediate said side portions.

References Cited in the file of this patent

UNITED STATES PATENTS

| | | |
|---|---|---|
| D. 143,510 | Silvera | Jan. 8, 1946 |
| 452,969 | O'Neill | May 26, 1891 |
| 792,508 | Dunn | June 13, 1905 |
| 1,063,884 | Kern | June 3, 1913 |
| 2,388,441 | Ressinger | Nov. 6, 1945 |
| 2,420,088 | Milburn | May 6, 1947 |
| 2,589,325 | Bachman | Mar. 18, 1952 |

FOREIGN PATENTS

| | | |
|---|---|---|
| 218,181 | Great Britain | July 3, 1934 |